United States Patent [19]

Pole et al.

[11] 4,199,634

[45] Apr. 22, 1980

[54] METHODS OF MAKING SOUND INSULATION MOLDABLE CARPETS

[75] Inventors: Ernest G. Pole; Everett S. Graham, both of Sarnia, Canada

[73] Assignee: Polysar Limited, Sarnia, Canada

[21] Appl. No.: 953,029

[22] Filed: Oct. 20, 1978

Related U.S. Application Data

[63] Continuation-in-part of Ser. No. 926,090, Jul. 19, 1978, abandoned, which is a continuation of Ser. No. 774,476, Mar. 4, 1977, abandoned.

[51] Int. Cl.² .............................................. B32B 3/02
[52] U.S. Cl. ........................................ 428/95; 156/72; 264/60; 428/96; 428/97; 428/174
[58] Field of Search ................ 428/62, 82, 85, 88, 428/95, 96, 97, 174, 175, 310, 315; 264/60; 156/72, 148, 247, 242, 243, 244, 245

[56] References Cited

U.S. PATENT DOCUMENTS

| | | | |
|---|---|---|---|
| 2,910,762 | 11/1959 | Priester | 428/95 |
| 2,915,427 | 12/1959 | Schriner | 428/95 |
| 4,016,318 | 4/1977 | DiGioia | 428/95 |

*Primary Examiner*—Marion E. McCamish
*Attorney, Agent, or Firm*—Stevens, Davis, Miller & Mosher

[57] ABSTRACT

A method of making sound insulating floor or wall covering in which carpet is backed with a layer of sound insulating material and a layer of contour retaining material for holding the covering in a desired contoured shape. The latter material, which is conveniently a carpet precoat, is made formable for instance by heating, the carpet and its backing is shaped to desired form, and the retaining material is allowed to set thus holding the carpet and sound insulating layer to that shape. Desirably, the insulating material is a curable rubbery polymer which is cured before carpet shaping takes place. For improved sound insulating properties, deaerated insulating material is used.

12 Claims, 4 Drawing Figures

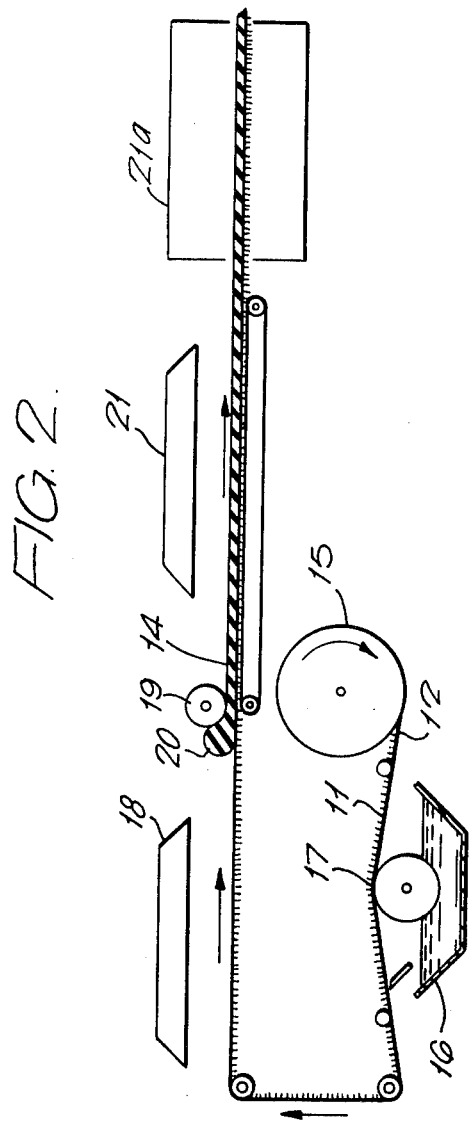

METHODS OF MAKING SOUND INSULATION MOLDABLE CARPETS

This application is a continuation-in-part of copending application Ser. No. 926,090 filed July 19, 1978 (now abandoned) and which is a continuation of application Ser. No. 774,476 filed Mar. 4, 1977 (now abandoned) and entitled "Methods of Making Sound Insulation".

This invention relates to methods of making sound insulation and is particularly concerned with insulation to be used for sound insulation of vehicles.

Sound insulation in vehicles is conventionally in the form of sound insulation pads which are disposed against surfaces of the vehicle bodywork such as on the floor, in the roof and wheel arches and in the doors and fire wall, to deaden sound to the vehicle interior such as may be caused by movement of the vehicle in contact with a road surface, engine operation and mechanically moving parts, and vehicle vibration.

The sound insulation pads are formed from cellulose or other fibers which may have been compacted and compressed, impregnated with a condensation resin such as phenolformaldehyde, the pads then being shaped to fit substantially in overall engagement with their associated bodywork surfaces. As low frequency sound which is transmitted through vehicles requires a particularly dense sound insulation significantly to lessen its transmission to the driver or passenger compartment, a special treatment is normally carried out in the making of the sound insulation pads. This treatment takes the form of coating the pads with bitumen or with polyvinylchloride containing a filler to increase pad density, the minimum weight requirements in the pads for insulating against low frequency sound being of the order of 60 oz./sp.yd.

Where sound insulation pads are placed in driving or passenger compartments, either on the floor on on wall areas directly behind the engine compartment, then for comfort and aesthetic purposes they are often covered by carpet. The carpets are of tufted or needlepunch construction. Polyethylene powder is normally shaken onto the primary backing of a continuously formed length of carpet and is then heated to cause it to melt and flow around the bases of the carpet tufts extending to the carpet back. Upon setting, the polyethylene holds the tufts in place. After individual carpets have been cut from the length of carpet, the polyethylene is softened by reheating and the individual carpets are shaped complementary to the shape of the sound insulation pads over which they are to be laid, this shape being retained by the polyethylene after it has been reset.

As may be realized from the above discussion, the provision of sound insulation pads and carpeting for covering the pads is a laborious process. The present invention provides a method by which this disadvantage is avoided.

Accordingly, the present invention relates to a method of making profiled sound insulating floor or wall covering from a backed carpeting in the form of a carpet to the underside of which has been attached a sound insulating backing and a material for forming a carpet contour retaining layer, the method comprising conditioning said material on the carpet to make it formable, and with the sound insulating backing in a flexible condition, contouring the carpet to a desired configuration, and setting the material so as to form the carpet contour retaining layer, the contour retaining layer in its set condition having a stiffness sufficient to retain the individual carpet in its desired configuration.

The carpet is preferably of tifted or needlepunch construction, but may be of any other construction such as woven if desired.

More particularly, the invention includes a method of making profiled sound insulating floor or wall covering comprising attaching to the underside of a carpet length, a sound insulating backing and a layer of material for forming a carpet contour retaining layer to form a backed carpet length, cutting backed individual carpets from the carpet length, conditioning said material on each individual carpet to make it formable, and with the sound insulating backing in a flexible condition, contouring the individual carpet to a desired configuration, and setting the material so as to form the carpet contour retaining layer, the retaining layer in its set condition having a stiffness sufficient to retain the individual carpet in its desired configuration.

The carpet contour retaining layer may be disposed either between the primary backing of the carpet and the sound insulating backing or on the underside of the sound insulating backing. However, an additional contour retaining layer may be incorporated whereby one layer is disposed on each side of the sound insulating backing. Preferably, a contour retaining layer is disposed between the primary backing and the sound insulating backing to additionally form a precoat for holding the carpet tufts to the primary backing fabric.

The carpet contour retaining layer is preferably a layer of a polymer which is stiff at normal ambient temperatures and is obtained by providing a coating of a latex of the polymer and at least partly evaporating the water from the latex. To condition the layer to make it formable and then to stiffen it, it is necessary firstly to heat the layer to soften it, after which the individual carpet is provided with its desired configuration and the contour retaining layer is allowed or caused to cool so as to reset it and hold the carpet in its desired configuration. The latex, if it is a latex of a stiff polymer, may be for example a latex of a resinous polymer or a blend of a latex of a resinous polymer with a latex of a rubbery polymer, but in this latter case, the ratio of resinous to rubbery polymer must be such as to provide the required stiffness to the carpet. Examples of resinous polymer are polystyrene and resinous copolymers of styrene with butadiene containing 70% or more of copolymerized styrene. The blend may be substantially of the order of 10% rubber latex to 90% resin latex to provide the necessary stiffness after setting of the layer to retain the desired configuration to the individual carpet. As an alternative to a stiff polymer, thermoplastic powder such as polyethylene powder may be applied to the primary backing, the powder then being heated to cause it to soften and flow around the bases of the tufts issuing from the underside of the primary backing, and then allowed or caused to set so as to lock the tufts to the primary backing. As further alternatives, non-queous hot melt materials and plastisols of PVC may be employed as the contour retaining layer.

The sound insulating backing is preferably a layer of a curable rubbery polymer. In a preferred method, the polymer is applied to the carpet length and is then cured before individual carpets are cut from the length. Conveniently, the rubbery polymer is obtained from a rubbery polymer latex compound capable of being gelled and gelling is effected before drying and curing. For purposes of gelling, known gelling agents may be used such as the delayed action types as exemplified by sodium silicofluoride and the heat gelling types as exemplified by compounds of zinc oxide, ammonia and ammonium salt, e.g. ammonium acetate, ammonium sulfamate systems. In the above preferred case where curing takes place before cutting, the backed carpet length may be rolled up for storage purposes preparatory to cutting it into individual carpets.

When using a rubbery latex compound for the insulating backing, it is preferred to perform the method by applying the precoat to the primary backing of the carpet (the precoat in this case being a latex of a stiff polymer), at least partially drying the latex, applying a rubbery latex compound as the sound insulating backing, gelling and drying and curing the backing, cutting an individual carpet from the backed carpet length, heating the individual carpet to soften the precoat, shaping the individual carpet to its desired configuration with the precoat in a softened condition, and allowing or causing the precoat to cool so as to hold the carpet in that shape. Alternatively, where a thermoplastic powder, for instance, is used as a precoat, then it is heated to soften it and cause it to flow around the bases of the carpet tufts prior to application of the sound insulating backing. A second softening is required before carpet shaping, followed by cooling of the precoat to set it and hold the desired shape of the carpet.

In an alternative method, the backed carpet length is fed directly to a cutting station wherein individual carpets are cut from the length and each is formed into its desired configuration before the sound insulating backing is cured.

The above method according to the invention includes a further alternative in which an indefinite length of sound insulating backing is prepared separately and is adhered to the underside to the indefinite carpet length, the carpet contour retaining layer having been previously applied to the primary backing.

The effectiveness of sound insulation is dependent upon its density. A minimum weight of 60 ounces per square yard dry weight for the insulating backing has been recommended for each finished individual carpet for the purpose of absorbing low frequency sounds so as to reduce them to a comfortable level inside the passenger compartment of a vehicle. Density of latex compounds is increased with increase in high density filler content. Where a rubbery polymer latex is used in forming the insulating backing, suitable filler contents to provide minimum acceptable sound insulating properties are of the order of 200 parts of filler per 100 parts of solids in the latex. Although higher levels of filler are obviously preferred for sound deadening, when as high as 700 parts of filler per 100 parts of latex solids are used, the sound insulating backing may have a low hot flex strength which can lead to cracking in cases where the backed carpet is fed around small diameter rolls such as occurs where it is fed through a multi-pass oven. In such instances, lower filler levels, around 300 to 450 parts, may be used as these give an acceptable balance of good sound insulation and hot strength requirements. Density is also increased where the sound insulation compound deaerated. While it is recognized that foamed sound insulation compound may be used for making carpet according to this invention and may offer a pronounced increase in softness underfoot in a vehicle, nevertheless foamed material is less attractive because for a given sound insulation requirement, the required thickness of foamed insulation backing may be impractical. Unfoamed compound is of a more practical nature and deaerated is to be preferred for its increased sound insulating and mechanical strength properties.

Instead of rubber latex compositions being employed in the compound for sound insulating backing, non-aqueous hot melt materials, plastisols, liquid rubbers curable at room temperature, polyurethane or asphalt compositions may be employed.

To illustrate the invention, the following examples will now be described with reference to the accompanying drawings in which:

FIG. 2, is a schematic side elevational view of apparatus to be used for making the backed carpeting of FIG. 1;

Figure 1:
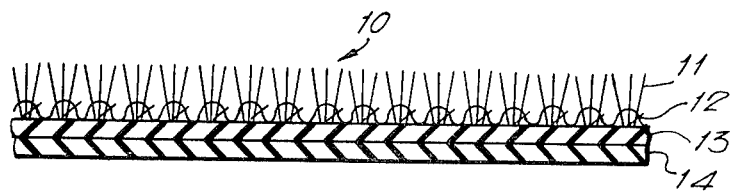
FIG. 1, is a cross-sectional view of part of an indefinite length of backed carpeting.

In FIG. 1, there is shown an indefinite length of backed carpet, generally shown by numeral 10, the carpet being of conventional tufted construction and having a pile 11 of synthetic fibers extending from a woven or non-woven primary backing 12. The primary backing is provided with a precoat 13 of a material for forming a carpet contour retaining layer which is a latex of a stiff polymer, e.g. a latex of a resinous styrene-butadiene copolymer as given below in Table A. This precoat is sandwiched between the primary backing 12 and a sound insulating backing 14. The sound insulating backing is a cured latex compound prepared according to any of the examples given below in Table B.

The backed carpeting of FIG. 1 is produced upon apparatus shown in FIG. 2. The indefinite length of unbacked carpet consisting of primary backing 12 and pile 11 is fed with pile uppermost from a roll 15 and across a bath 16 containing resinous styrene-butadiene latex at which point the precoat is applied in conventional manner by a rotating lick roller 17. The precoated carpet is then fed beneath a radiant heater 18, which may be an infra-red heater, to partially dry the precoat.

The sound insulating backing 14 is then applied to the precoat by feeding the carpet beneath a doctor roll 19 which controls the thickness and rate of distribution of the uncured latex backing compound from a bank 20 of the compound maintained on the ingoing side of the doctor roll. The backed carpet is passed under another radiant heater 21 to gel the backing and from thence through a hot air circulating oven 21a to completely dry and cure the backing. Each point along the carpet takes approximately from 10 to 30 minutes to pass through the oven, the time taken to cure the backing depending upon the precise weight applied. The temperature of the air in the oven in this example is around 265° F., but it is to be understood that the chosen temperature may be higher or lower than this and may be dependent upon the compound used for the backing, the speed at which drying and curing is required to take place and the capability of the carpeting to withstand high temperatures.

Figure 3:
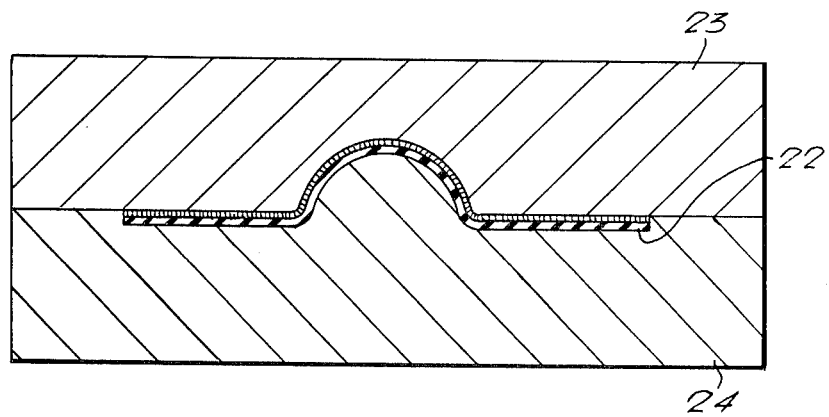
FIG. 3, is a cross-sectional view of an individual carpet being shaped between formers.

As may be seen from the examples in Table D below, the sound insulating backing may be extremely thin compared with normal foam backing provided for carpets while providing the required degree of insulation against low frequency sounds in vehicles. The maximum thickness shown by the examples is slightly greater than 0.08". The cured backing material in this maximum thickness may be shaped with the remainder of the carpet into a desired configuration and held in that configuration by the precoat material after heat has been applied to the carpet to raise the temperature of the precoat material above its softening point and the precoat material has reset. Accordingly, to make preshaped individual carpets or coverings for fitting into the required sound insulating areas of a vehicle, the indefinite length of carpet 10 in planar condition is subsequently treated in one of two ways. In one way, it is rolled up for storage purposes for subsequent cutting, heating and heat forming. This operation takes the form of die-cutting the carpet into individual carpets with minimum wastage, the die-cut carpets being of shapes projected from their final desired configuration. After being cut into individual carpets, each carpet is heated up to a temperature sufficient to heat soften the resinous styrene-butadiene layer forming the precoat. In this instance, this temperature is around 350° F. With the precoat in its softened condition, the carpet is formed into its desired configuration. One example of this is shown in FIG. 3 in which an individual carpet 22 is being heat formed between shaped surfaces of two formers 23 and 24 which provide a configuration to the carpet to make it suitable to be fitted onto the floor at the rear of the passenger compartment of a car. The formers may themselves be heated to maintain the softening temperature of the precoat until the desired configuration of the carpet has been attained. The carpet is then allowed or caused to cool while remaining in its sandwiched position during which the precoat resets. After removal of the carpet from between the formers, it is held in its desired configuration by the stiffness of the precoat layer which thereby acts as a carpet contour retaining layer.

In the second way of treating the indefinite length of backed carpet, it is fed directly from the hot air drying and curing oven to a cutting station to be formed into individual carpets and shaped between formers in the manner described above.

Complete drying and curing of the sound insulating backing is considered to be most desirable and possibly essential if the indefinite length of carpet is to be rolled up for storage. However, it may be possible to shape individual carpets, if they are cut and shaped after having the insulating backing applied to them and gelled with little or no curing action having taken place. For instance, vacuum forming techniques may be used upon individual carpets to urge them into intimate contact with former surfaces with the carpet edges being clamped so as to seal them. The sealed edges which would obviously be distorted would then be removed to make the carpet into its desired size and shape after forming it into its required configuration.

Figure 4:
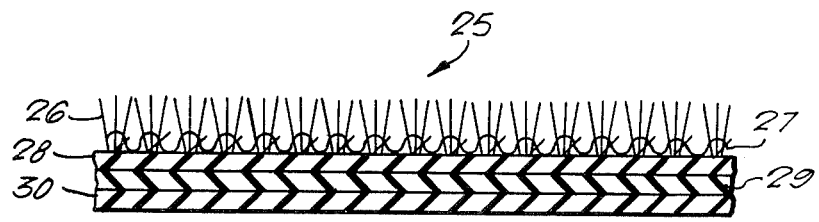
FIG. 4, is a view similar to FIG. 1 of another indefinite length of backed carpeting.

In another example, a carpet 25 is of indefinite length, as shown in FIG. 4. The carpet has a pile 26, woven primary backing 27, precoat layer 28 formed from a latex of a resinous styrene-butadiene copolymer and sound insulating backing 29 similar to those described with reference to FIG. 1. In this present example, however, the carpet is provided with a second carpet contour retaining layer 30 of resinous styrene-butadiene copolymer. This second layer is located on the side of the backing 29 remote from the precoat 28. The carpet is made in the manner described with reference to FIG. 2 above and is conveniently provided with its second layer 30 of copolymer by the known coating techniques, after drying and curing of the sound insulating backing.

In alternative methods of forming the sound insulating backing on indefinite or individual lengths of carpet, curtain coater techniques are employed. Such techniques are well known in practice and will be clear to those skilled in the general art of applying coating layers to surfaces of conveyed lengths of textile materials.

TABLE A

For the purpose of providing the carpet contour retaining layer in the above examples, a latex compound was used of the following formulation.

TABLE A

|  | Parts by Weight |
| --- | --- |
| Polystyrene latex | 95.0 |
| Potassium oleate | 2.0 |
| Sodium hexametaphosphate | 0.5 |
| SBR latex (27% bound styrene) | 5.0 |
| Wingstay L[b] | 0.1 |
| Calcium carbonate filler | 50.0 |
| Polyacrylate thickener | Sufficient to give viscosity of 7,000–12,000 cps. |

Calculated compound total solids 51.5%.

TABLE B

For the purpose of providing sound insulating backing in the above examples, a rubbery latex was used according to each of the following formulations.

TABLE B

| COMPOUNDS (dry parts by weight) | | | | | | |
| --- | --- | --- | --- | --- | --- | --- |
|  | Total Solids % | 1 | 2 | 3 | 4 | 5 |
| SBR latex (27% bound styrene) | 68 | 100 | 100 | 100 | 100 | 100 |
| Coconut fatty acid soap | 30 | 1.3 | 1.3 | 1.3 | 1.3 | 1.3 |
| Sodium hexametaphosphate | 25 | 0.5 | 0.5 | 0.5 | 0.5 | 0.6 |
| Triethyltrimethylenetriamine | 50 | 1.25 | 1.25 | 1.25 | 1.25 | 1.25 |
| Dow Corning 200[a] | 100 | 0.08 | 0.08 | 0.08 | — | 0.08 |
| Dow Corning H-10[a] | 10 | — | — | — | 0.10 | — |
| Zinc diethyldithiocarbamate | 60 | 1.0 | 1.0 | 1.0 | 1.0 | 1.0 |
| Zinc mercaptobenzothiazole | 60 | 1.25 | 1.25 | 1.25 | 1.25 | 1.25 |
| Wingstay L[b]/Aminox[b] | 60 | 0.75 | 0.75 | 0.75 | 0.75 | 0.75 |
| Sulfur | 60 | 1.65 | 1.65 | 1.65 | 1.65 | 1.65 |
| Carbon black pigment dispersion | 35 | 1.0 | 1.0 | — | — | 2.0 |
| Antioxidant 719[b] | 40 | 0.5 | 0.5 | 0.5 | 0.5 | — |
| Zinc oxide | 53.5 | 3.0 | 3.0 | 3.0 | 3.0 | — |
| Zinc oxide | 52.6 | — | — | — | — | 4 |
| Sodium lauryl sulphate | 30 | 1.0 | 1.5 | 1.6 | 1.9 | 2.0 |
| Sorbitol | 70 | 1.0 | 1.0 | 1.0 | 1.0 | 1.0 |
| Ammonia | 28 | 1.0 | 1.15 | 1.2 | 1.25 | 1.25 |

TABLE B-continued

| COMPOUNDS (dry parts by weight) | Total Solids % | 1 | 2 | 3 | 4 | 5 |
|---|---|---|---|---|---|---|
| Barium sulphate[c] | 100 | 200 | 400 | 400 | 600 | 700 |
| Blend of monethanolamine 1.07 parts by wt. and ammonium sulphamate 6.0 parts by wt. | 60 | 7.07 | 7.07 | 7.07 | 7.07 | 7.07 |

[a] These materials are silicone type antifoaming agents
[b] These materials are antioxidants
[c] The material used was Barytes 22

When compounding latex, it is common practice by those familiar with the art of latex compounding to calculate the amount of each ingredient on the weight of dry latex solids in the compound. In the above Table B, for ease of calculation, the weight of dry latex solids is considered to be 100 and the amounts of the other ingredients are recorded as dry parts per 100 dry parts of latex solids. When these ingredients are added in the form of water dispersions, it is obvious that the amount of water present must be taken into consideration in order to add the desired amount of dry ingredients.

Hence, to take SBR latex as an example of an ingredient, to achieve 100 dry parts by weight of latex in each finished compound when the starting latex material is 68% total solids, there must be 147 wet parts by weight of the starting material which after drying gives 100 dry parts by weight, i.e. $68/100 \times 147 = 100$.

To take another example, 5 wet parts by weight of sodium lauryl sulphate is necessary to provide 1.5 dry parts in compound 2, i.e. $(5 \times 30)/100 = 1.5$ only. The properties of the compounds were as set out by Table C.

TABLE C

| | COMPOUNDS | | | | | | |
|---|---|---|---|---|---|---|---|
| | 1 | | 2 | 3 | | 4 | 5 |
| Properties | non-deaerated | deaerated | non-deaerated | non-deaerated | deaerated | deaerated | non-deaerated |
| Calculated total solids, Wt. % | 81.8 | 81.8 | 87.8 | 88.0 | 85.2 | 90.8 | 91.5 |
| pH | 10.4 | 10.0 | 10.1 | 10.6 | 10.3 | 10.3 | 10.2 |
| Viscosity, LVF #4 at 30 rpm, cps. | 1,200 | 800 | 2,700 | 2,400 | 5,000 | 3,600 | 7,800 |
| Density gms/cm$^3$ | 1.10 | — | 1.09 | 1.33 | 2.03 | 2.43 | 1.79 |

Compound 1 was deaerated by allowing it to stand for one day.

Compound 3 was deaerated by diluting it from 2,400 to 960 cps. (from 88% to 85.2% T.S.), standing 1 day, and then thickening it to 5,000 cps. by adding 0.41 p hls. of a polyacrylate thickener.

Deaeration of compound 4 was carried out after addition of Barytes 22 by applying a vacuum of 28.5 inches of mercury for about 1 hour. Then the ammonia and gelant were added.

For purposes of determining characteristics of cured sound insulation backings applied to carpet according to the examples described above, portions of compounds 1 to 5 were applied at uniform thickness to fabric coated with polytetrafluoroethylene. After curing, the finished backings were removed from the fabric and the characteristics shown in the following Table D were obtained.

TABLE D

| | CURED INSULATION BACKING OBTAINED FROM COMPOUND | | | | | | |
|---|---|---|---|---|---|---|---|
| | 1 | | 2 | 3 | | 4 | 5 |
| | non-deaerated | deaerated | non-deaerated | non-deaerated | deaerated | deaerated | non-deaerated |
| Weight ounces/yd.$^2$ | 49 | 110 | 60 | 66 | 77 | 68 | 92 |
| Thickness, inches | 0.064 | 0.085 | 0.067 | 0.069 | 0.047 | 0.038 | 0.086 |
| Density, gms/cm$^3$ | 1.03 | 1.73 | 1.19 | 1.27 | 2.19 | 2.40 | 1.49 |
| Calculated thickness at 60 ounces/yd.$^2$ inches | 0.078 | 0.046 | 0.067 | 0.063 | 0.037 | 0.033 | 0.054 |
| T.S.*, psi  ASTM D-412 Die C | 76 | 140 | 48 | 35 | 86 | 62 | 27 |
| Elongation, %  | 210 | 195 | 205 | 150 | 135 | 90 | 85 |
| Tear Strength, lbs./inch, ASTM D-624, Die C | 22 | 36 | 16 | 12 | 21 | 17 | 10 |
| Hardness - Shore A, ASTM D-2240 | 28 | 61 | 32 | 35 | 71 | 77 | 40 |

*Tensile Strength

Compounds 1 and 3 were applied as sound insulating backings in both deaerated and non-deaerated form. Compounds 2 and 5 were applied in non-deaerated form only while compound 4 was applied in deaerated form The above figures of Table D show that for each compound made in deaerated and non-deaerated form, insulating backing made from deaerated material has a greater tensile and tear strength and Shore Hardness than non-deaerated material. Its percentage elongation is less than for non-deaerated material. The maximum calculated thickness to produce minimum density requirements for sound insulation, i.e. 60 ounces/square yard was 0.078 inches for the non-deaearted material of compound 1. The thickness requirements for deaerated materials contrasted strongly with the non-deaerated materials. The use of such thin insulating layers has the effect of minimizing any resistance to flexing of the layers during shaping and setting of the individual carpets into their desired configurations.

What is claimed is:

1. A method of making profiled sound insulating floor or wall covering comprising a carpet, a layer of formable material attached to the underside of the carpet, the layer of formable material being capable of setting after it is formed to make a carpet contour retaining layer, and an unfoamed sound insulating backing which includes a curable rubbery polymer made by preparing a latex composition which includes at least 200 dry parts by weight of filler per 100 dry parts by weight of solids in the latex, the method comprising conditioning said layer of material to make it formable, and with the sound insulating backing in a flexible condition, contouring the covering to a desired configuration, and setting the material so as to form the contour retaining layer, the contour retaining layer in its set condition having a stiffness sufficient to retain the covering in its desired configuration.

2. A method of making profiled sound insulating floor or wall covering comprising attaching to the underside of a carpet length, a layer of formable material which is capable of setting after it is formed to make a carpet contour retaining layer, and an unfoamed sound insulating backing to form a backed carpet length, the backing including a curable rubbery polymer made by preparing a latex composition which includes at least 200 dry parts by weight of filler per 100 dry parts by weight of solids in the latex, cutting backed individual coverings from the carpet length, conditioning said material on each individual covering to make it formable, and with the sound insulating backing in a flexible condition, contouring the individual covering to a desired configuration, and setting the material so as to form the contour retaining layer, the contour retaining layer in its set condition having a stiffness sufficient to retain the covering in its desired configuration.

3. A method according to claim 2 wherein the carpet length is treated with the layer of formable material and then with the sound insulating backing.

4. A method according to claim 3 wherein the carpet length comprises a primary backing and carpet pile extending from one side of the primary backing, the method comprising applying the layer of formable material to the primary backing to form a precoat to hold the carpet pile to the primary backing.

5. A method according to claim 4 wherein another layer of formable material is applied to the carpet length, said other layer being disposed on the side of the sound insulating backing remote from the precoat.

6. A method according to claim 2 wherein the rubbery polymer is cured before cutting the individual covering from the carpet length.

7. A method according to claim 6 comprising effecting gelling of the sound insulating backing before curing the polymer.

8. A method according to claim 2 comprising applying the formable layer and the sound insulating backing to the carpet length and gelling the sound insulating backing and then passing said length directly to a cutting station wherein the individual coverings are cut from the length and each is formed into its desired configuration before the polymer is cured.

9. A method according to claim 2 including deaerating the latex composition to increase the density before it is applied to the carpet length.

10. A method according to claim 2 comprising applying the layer of formable material to the carpet length as a latex of a stiff polymer, at least partly drying the latex, and after application of the sound insulating backing, heating the layer of formable material so as to soften it and render it formable, and providing each individual covering with its desired configuration before the polymer cools and resets.

11. A method according to claim 2 wherein the carpet length comprises a primary backing and carpet pile extending from one side of the backing, the method comprising coating the primary backing with the layer of formable material to form a precoat to hold the carpet pile to the primary backing, the formable material being a latex of a stiff polymer, partially drying the precoat, applying the sound insulating backing onto the partially dry precoat, gelling, drying and curing the backing, and after cutting individual coverings from the carpet length, heating each individual covering to soften the precoat and render it formable, after which the precoat is set by cooling it.

12. A sound insulating floor or wall covering comprising a carpet having a carpet pile carried by and extending from one side of a primary fabric backing and an unfoamed sound insulating backing and a carpet contour retaining layer carried upon the other side of the primary fabric backing, the sound insulating backing including a cured rubbery polymer made by preparing a latex composition which included at least 200 dry parts by weight of filler per 100 dry parts by weight of solids in the latex, the covering being in a non-planar configuration and held in said configuration by the stiffness of the carpet contour retaining layer which is in a set condition.

* * * * *